(12) United States Patent
Vasilev

(10) Patent No.: US 7,370,668 B2
(45) Date of Patent: *May 13, 2008

(54) VALVE FOR WINTERIZING A POOL

(76) Inventor: Dimce Vasilev, 415 W. Beldon, Unit K, Addison, IL (US) 60101

( * ) Notice: Subject to any disclaimer, the term of this patent is extended or adjusted under 35 U.S.C. 154(b) by 163 days.

This patent is subject to a terminal disclaimer.

(21) Appl. No.: 10/814,519

(22) Filed: Mar. 31, 2004

(65) Prior Publication Data

US 2004/0177882 A1 Sep. 16, 2004

(51) Int. Cl.
*F16K 15/02* (2006.01)

(52) U.S. Cl. .............. 137/528; 137/512.1; 137/533.19; 4/496; 4/507

(58) Field of Classification Search ............. 251/149.1, 251/148; 210/169; 4/488, 496, 507; 137/533.25, 137/533.31, 543.23, 543.21, 528, 512.1, 137/533.19
See application file for complete search history.

(56) References Cited

U.S. PATENT DOCUMENTS

| | | | |
|---|---|---|---|
| 2,268,119 A * | 12/1941 | Honstetter et al. ..... | 137/543.13 |
| 3,704,002 A * | 11/1972 | Skarzynski ............... | 251/149.6 |
| 3,799,589 A * | 3/1974 | Boelkins ..................... | 285/281 |
| 3,835,884 A * | 9/1974 | Ishikawa et al. ............ | 137/550 |
| 4,275,907 A * | 6/1981 | Hunt ............................ | 285/18 |
| 4,281,422 A | 8/1981 | Simonelli | |
| 4,368,550 A | 1/1983 | Stevens | |
| 4,660,803 A * | 4/1987 | Johnston et al. ......... | 251/149.1 |
| 4,752,979 A | 6/1988 | Goacher, Sr. | |
| 4,905,964 A * | 3/1990 | Shiozaki ................... | 251/149.6 |
| 5,076,328 A * | 12/1991 | Lyon ............................ | 138/93 |
| 5,211,197 A * | 5/1993 | Marrison et al. ...... | 137/614.04 |
| 5,259,076 A | 11/1993 | Voight et al. | |
| 5,577,274 A * | 11/1996 | Plotsky et al. .................. | 4/507 |
| 5,671,902 A | 9/1997 | Gauthiere et al. | |
| 5,911,235 A * | 6/1999 | Henderson et al. ........... | 135/85 |
| 6,009,895 A * | 1/2000 | Wass et al. .................. | 137/223 |
| 6,447,017 B1 * | 9/2002 | Gilbreath et al. ............. | 285/89 |
| 6,517,119 B2 * | 2/2003 | Thomas ...................... | 285/276 |
| 2002/0036015 A1* | 3/2002 | Miyajima et al. ...... | 137/543.23 |

* cited by examiner

*Primary Examiner*—John Rivell
*Assistant Examiner*—Cloud Lee

(57) ABSTRACT

A valve assembly for use in winterizing a swimming pool closes to prevent pool water from entering into a pool pipe situated below the water line and opens to allow fluid or air to be pumped out of the pool pipes, including an adaptor having threads for attachment to a hose so the pipe contents may be pumped directly into the hose and out of the pool.

8 Claims, 5 Drawing Sheets

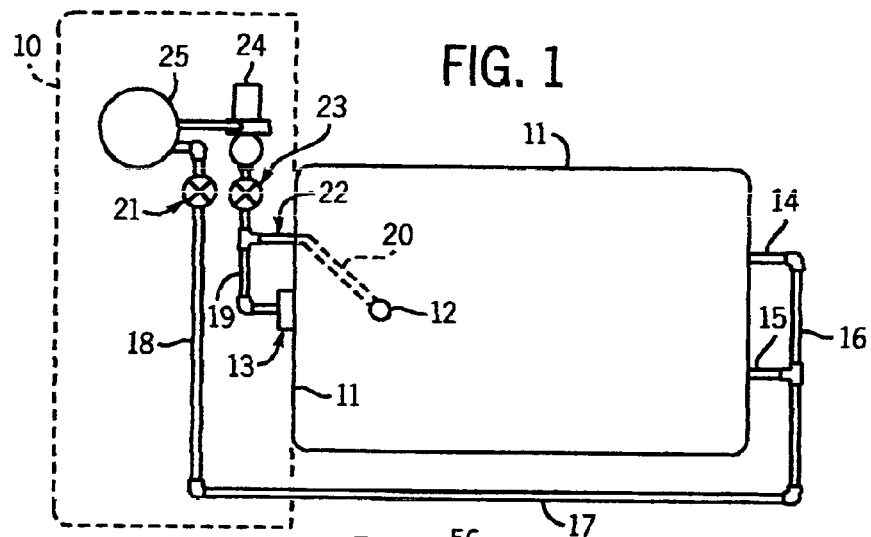
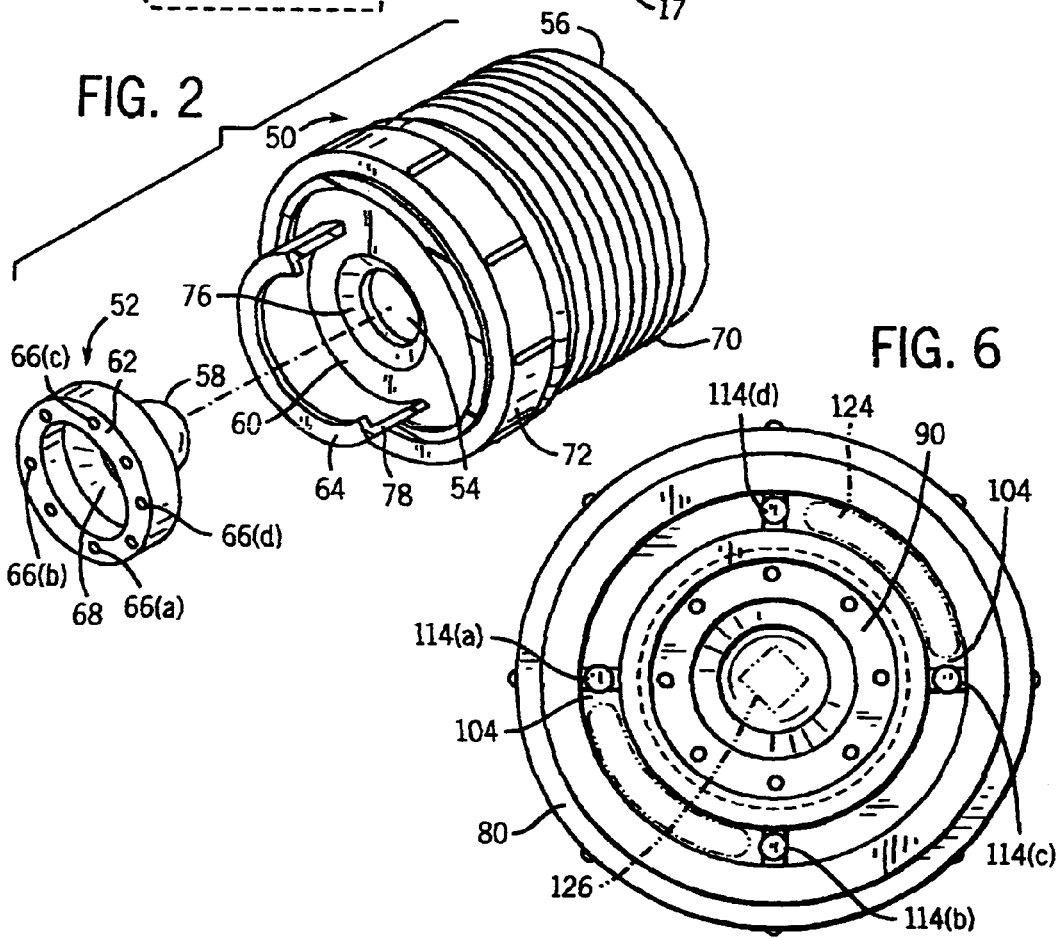

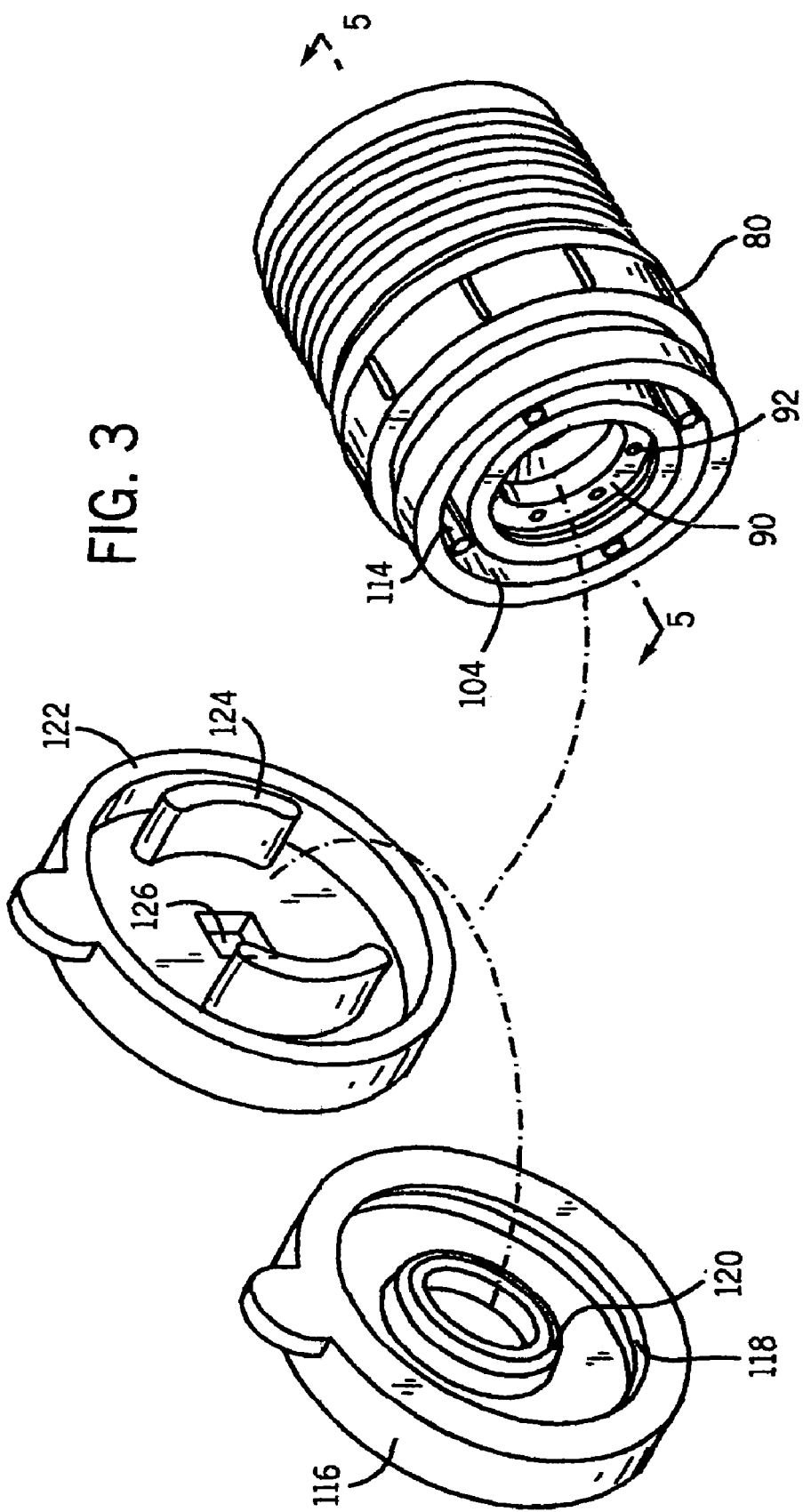

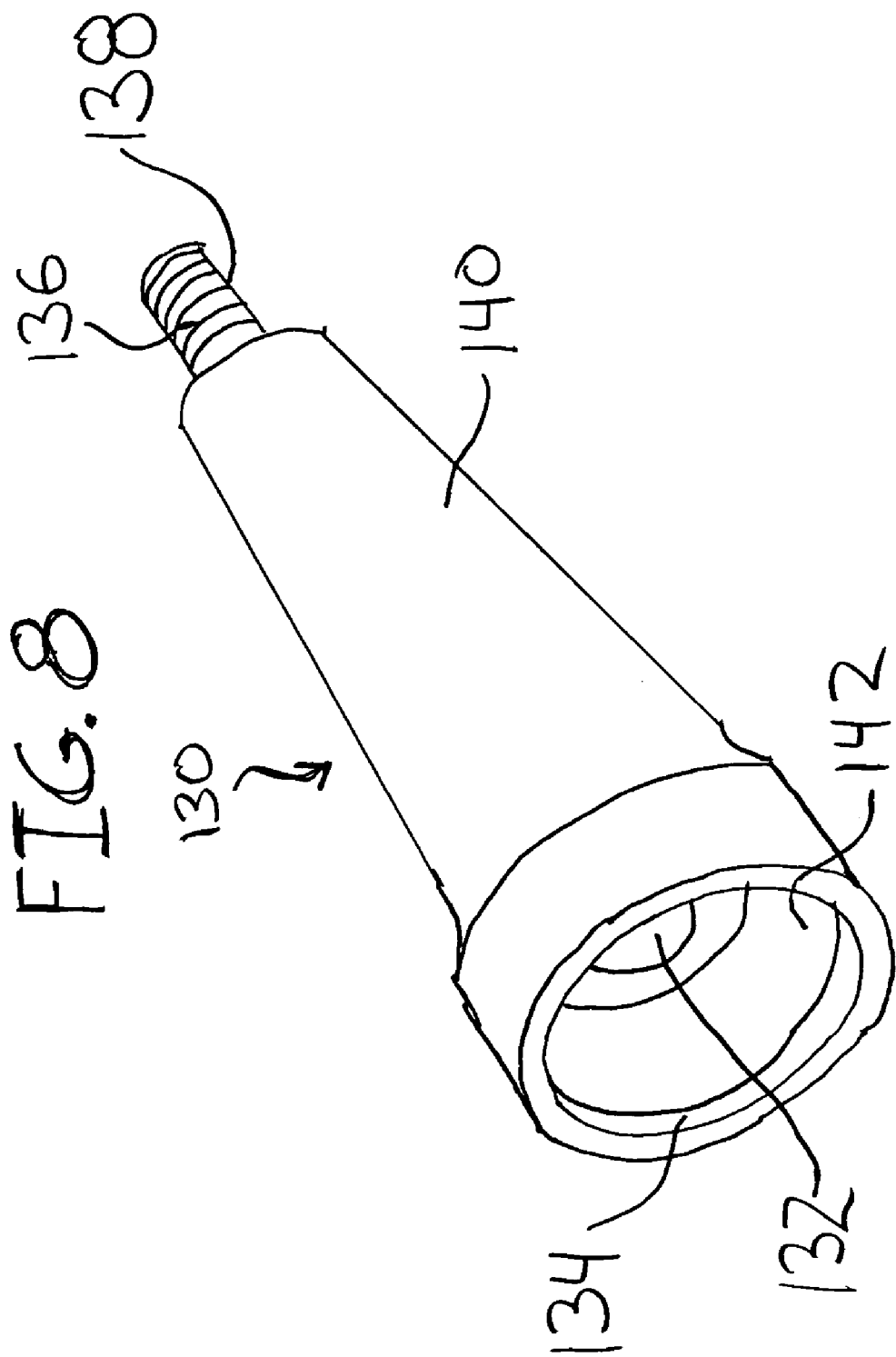

VALVE FOR WINTERIZING A POOL

FIELD OF THE INVENTION

This invention concerns a valve system for coupling a hose or other article to a swimming pool drain or supply pipe fitted to a swimming pool aperture for use in discharging and salvaging winterization fluid.

BACKGROUND OF THE INVENTION

In climates that have freezing seasonal temperatures, the maintenance of swimming pools includes a winterizing process. As part of the winterizing process, the system of conduits and pipes that support water flow into and out of the pool are drained because water left in those pipes and conduits will likely freeze and expand as the temperature drops below freezing, damaging the pipes and fittings. For in-ground pools, the winterizing process typically involves the steps of draining water from all pipes situated above the frost line (typically to three feet below ground level), partially filling the pipes with anti-freeze to prevent the freezing of residual water, closing exposed orifices in the pool side wall to prevent ingress of water, debris, rain or snow into the pipes and conduits, and removing or protecting outside mechanical equipment. It is necessary to prepare swimming pools for such temperatures in order to avoid extensive damage, particularly to those pipes and conduits that are buried in the ground but above the frost line.

In most in-ground pool systems, the return and drain pipes are fitted through each respective aperture in the pool wall. The pool apertures are typically situated well below the normal water line, perhaps by as much as thirty to fifty centimeters. In prior art winterization procedures, one first reduced the water level to below the aperture levels so that the water remaining in the pipes above the frost line can be drained. Such a procedure requires extensive draining of pool water, which can take up to eight hours. Draining to that level can involve the removal of several thousand liters of water from a typical residential swimming pool, perhaps as much as twenty-five thousand liters. The drained water usually is wasted. After the pool is drained the pipe ends are capped so that water and moisture cannot enter the pipes. As a cautionary measure, antifreeze has been and continues to be (in most cases) added before the pipe ends are capped to prevent freezing and expansion of residual water. The winterization process further includes refilling of the pool to about the normal water level to protect the pool structure from collapsing as the surrounding ground freezes and expands.

Referring to the drawings, a conventional swimming pool arrangement is illustrated by FIG. 1; the arrangement comprises generally the pool having a peripheral rectangular wall as shown at 11 and a circulation and filtration system, the several parts of which are encompassed within the area of the broken line 10, is situated contiguous to one end of the pool 11. Typically, the plumbing accessories include at least a main drain 12 which draws water and sediment from the bottom of the swimming pool and a skimmer 13 through which water to be filtered and re-circulated is withdrawn and debris is removed. In the circulation process, water withdrawn from the pool through the main drain and from the skimmer is filtered and optionally chemically treated and returned to the swimming pool through returns such as shown at 14 and 15.

A pump 24 withdraws water from the swimming pool, the water is filtered at 25, and through use of appropriate valves, such as 21 and 23, is reintroduced into the swimming pool at return points such as those illustrated at 14 and 15. Suction piping, some of which is illustrated at 19 and 20, and discharge piping, as shown at 16, 17 and 18, are utilized to move the water between the pump and the pool. The pool has a plurality of apertures to accommodate return piping 14 and 15 and main drain piping 20. Likewise, skimmer 13 has an aperture to accommodate suction piping 19. Portions of the piping referred to at 14, 15, 16, 17, 18, 19, and 20 are above the frost line and all water must be expunged therefrom to prevent freezing and damage to the piping system. As discussed above, antifreeze is introduced into the pool pipes to prevent residual water from freezing. At the conclusion of the winter dormancy, heretofore the antifreeze solution has been discharged into the pool water, i.e., water is not drained from the pool to below the pool aperture levels so that the antifreeze can be saved.

It is an object of the present invention to eliminate the step of draining the pool water to below the pool apertures for emptying the pipes of pool water and adding an antifreeze solution thereto at the conclusion of a summer season. Another object is to salvage the solution, without lowering the water level, before the valves are removed at the start of the spring/summer season.

SUMMARY OF THE INVENTION

A valve system comprises a valve assembly and a valve adaptor. The valve assembly has a housing that is threaded or otherwise configured at one end so that it can be secured at a pool aperture to an inlet or outlet pipe-end. Internally, the assembly has a flow aperture adjacent a flow conduit so that water and air can flow through the valve. A ring circumscribes the flow aperture and provides a flow occlusion surface defining a gate plate. In a first, closed state, a valve gate having at least one gate-flow aperture is in contact with the flow occlusion surface. In this position, the flow occlusion surface obstructs liquid flow, preventing liquid from flowing through the gate-flow aperture(s). In a second, open state, the valve gate is forced away from the flow occlusion surface under the pressure of air or liquid flowing into the valve, through the flow conduit and the flow aperture. A containment lip fixed to the valve housing internally circumscribes the outlet of the valve, prohibiting further movement of the valve gate in the direction of flow. When the valve is open, the boundaries of a gate channel are defined by the location of the flow aperture and the gate-flow aperture(s). The valve thus allows fluid to flow in only one direction, that is out of the pool pipes in the direction of the pool. At the outlet, the valve system includes an adaptor component having threads for connection to a hose or other conduit. Pumped air or fluid may thus flow from the pool pipe and through the flow conduit, flow aperture, flow channel, gate-flow aperture, through the adaptor and into a hose. The pumped fluid, typically antifreeze or an antifreeze/water mixture, is allowed to flow from the pipe into the hose until the pump is turned off. The valve assembly may then be removed from the pool aperture, allowing pool water to flow into the pool pipe and conduit system.

BRIEF DESCRIPTION OF THE DRAWINGS

In describing the present invention, reference is made to accompanying drawings wherein:

FIG. 1 is a schematic diagram illustrating by plan view a swimming pool equipped with a typical water circulating and filtration system.

FIG. 2 is an exploded perspective view showing a first exemplary embodiment of the valve assembly component of the present invention.

FIG. 3 is an exploded perspective view that shows a second exemplary embodiment of the valve assembly component of the present invention along with a valve cap and a valve socket.

FIG. 6 is a end view of the valve assembly component of the second embodiment of the present invention showing in phantom components of a socket as applied to the valve.

FIG. 8 is an exploded perspective view of the removable adaptor component of FIG. 7.

DETAILED DESCRIPTION OF THE PREFERRED EMBODIMENT

Figure 4:
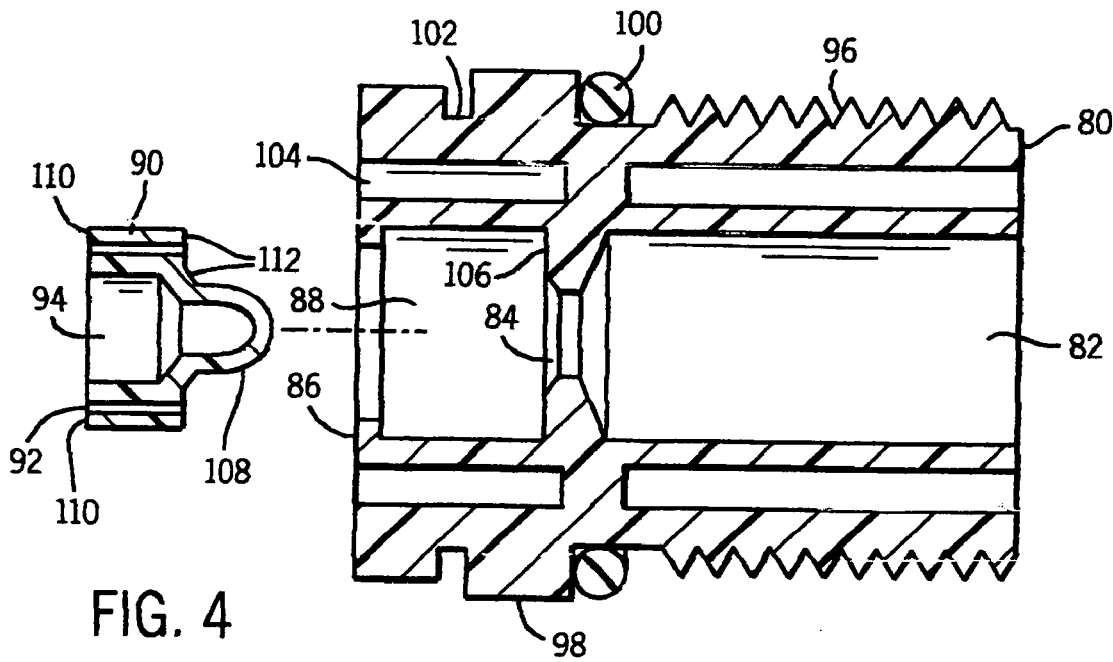
FIG. 4 is an exploded cross-sectional view taken along lines 5-5 of FIG. 3.

According to the invention, a valve system for use in winterization management process has both valve assembly and adaptor components. The valve assembly is configured for fastening at a pool-wall aperture to a pipe end (inlet or outlet). In pool systems having a main drain, a valve assembly may be fastened thereto as well. In the preferred embodiment, the valve adaptor is configured at one end for attachment to the valve assembly and at the other end for attachment to a hose, or other accessory. As discussed in more detail below, the valve assembly opens to allow water, antifreeze, or mixture thereof to be pumped through a pipe/conduit and into the pool if the adaptor component of the invention is detached from the valve assembly. If the adaptor and valve components are coupled together, water/antifreeze will flow through the open valve and adaptor and, preferably, into a hose threaded to the adaptor. Conversely, the valve closes to prevent fluid from flowing back into the pipe/conduit. The valve assembly of the present invention thereby obviates the need to drain the pool to a water level below the pool-wall apertures (in FIG. 1, associated with the returns 14 and 15, skimmer 13, and main drain 12) for emptying the pipes and conduits of all water when the pool is conditioned for winter conditions. For the reopening procedure in the warm weather season, the valve assembly provides that fluid in the pool pipes may be pumped into a hose and salvaged. The valve is then removed from the pool aperture and pool water enters and fills the pool pipes.

Referring to FIG. 2, a first embodiment of the valve assembly component of the present invention includes a main valve housing 50 and a valve gate 52. The valve housing 50 includes a flow aperture 54 adjacent a flow conduit or cavity, not visible in FIG. 2. The flow conduit continues through the opposite end 56 of the housing. The valve housing has threads 70 for securing the valve assembly at a pool aperture to the end of a pipe/conduit. A rim 72 is preferably molded to or part of the valve housing so the valve assembly can be tightened against the pool wall. A gasket is preferably utilized to form an airtight seal between the rim 72 and the pool wall/surface.

The valve gate 52 preferably includes a conical plug 58 configured to rest against a housing seat 76 when the valve is closed, as discussed below. Preferably, the conical plug 58 is hollow, the outer shell configured to fit within flow aperture 54 allowing the plug to glide along the housing seat 76. The valve gate 52 includes a ringed control plate 62 fixed to the conical plug 58. Preferably, the dimension (diameter) of the area 68 within the ring 62 is uniform with that of the adjoining hollow portion of conical plug 58. The control plate 62 further includes a plurality of small holes or gate-flow apertures 66(a), 66(b), 66(c), and 66(d) extending therethrough and circumferentially disposed around the plate.

In one embodiment, the valve is assembled by pressing the control plate 62 onto and past a plastic semi-flexible containment lip 64 and into a gate channel defined by the containment lip 64, a valve housing gate channel wall 78, and a housing gate plate 60. The gate channel confines movement of the valve gate between "valve open" and a "valve closed" positions. As noted, the main valve housing 50 has a circular containment lip 64 extending radially inward from a main valve housing gate channel wall 78 (partially shown).

The containment lip catches the control plate 62 by a portion of its outer perimeter when the valve gate 52 moves, under the force of water or air flowing out of the pool pipe, away from the housing gate plate 60 to a "valve open" position. The containment lip 64 is far enough away from the housing gate plate 60 to allow the valve gate to move a limited distance (preferably one-half centimeter) from the housing gate plate 60, thereby allowing water or air to flow through a flow channel formed between the housing gate plate 60 and the control plate 62. Water or air may thus flow through the flow aperture 54, through the gate-flow apertures 66(a), 66(b), 66(c), and 66(d), and out of the valve.

In application, the valve assembly is tightened into an aperture of the pool leading to a drain or return. The pump and pump system valves are adjusted so that air is pumped through the corresponding pipe. Pressurized air in the pipe will push the water toward the orifice and will force the valve gate 52 away from the housing gate plate, allowing water to flow through and out of the valve.

After all the water has exited the pipe, the pump is turned off. The pool water exerts sufficient force against the control plate 62 and the interior of the conical plug 58 to move the valve gate 52 to the closed position. In the closed position the control plate 62 is in contact with and pressed against the surface (occlusion surface) of the housing gate plate 60, closing off the gate-flow apertures 66(a), 66(b), 66(c), and 66(d), thus preventing pool water from flowing into the valve and back into the pipe. In an alternate embodiment, the water in the pool forces the valve gate 52 against the housing gate plate 60 and prevents water from flowing through the flow aperture 54, closing the valve. In such an embodiment, the control plate 62 includes slits spatially situated at its outer circumference (thus resembling a toothed wheel) so that pipe water may exit the valve therethrouh when the valve gate is in the open position. In another embodiment, the valve gate has flow apertures and slits, and both the gate-flow aperture and the flow aperture are closed off when the valve gate contacts the housing gate plate 60.

Depending upon the pumping capacity of pump 24, each of the return conduits 14 and 15, the skimmer conduit 19, and main drain conduit 22 may be emptied individually/sequentially, in pairs, or all at the same time. In any case, it is preferred that one valve assembly be provided for each conduit.

Preferably, both the main valve housing 50 and the valve gate 52 are molded from forty percent calcium-filled polypropylene.

A second embodiment of the valve assembly component of the present invention is shown in FIGS. 3-6. The valve assembly of this embodiment has a valve housing 80 and a valve gate 90. As shown in the cross-sectional view of FIG. 4, the valve housing 80 has a flow cavity 82 for directing water or air flow from a pipe or conduit to a flow aperture 84. A containment lip 86 extends radially inward at one end of the valve housing. A gate channel 88 is defined on one side by the containment lip 86 and on the opposite side by a gate plate 106. A valve gate 90, having a plurality of gate-flow apertures 92 (see FIG. 3), is configured for reciprocating movement within gate channel 88. Fluid or air pumped into the flow cavity 82 exerts force against a conical structure 108 of the valve gate 90. This force moves the valve gate to an open position wherein the outer perimeter 110 of the valve gate is pressed against the containment lip 86 (shown in phantom as 110(b) in FIG. 5) and the conical portion of the valve gate, shown as 108(b), is removed from the flow aperture. In this position a flow channel exists between the gate plate 106 and the opposing surface 112 of the valve gate. In the preferred embodiment the flow channel is four centimeters wide. The plurality of gate-flow apertures 92 allow fluid or air to flow out of the valve assembly component. In the preferred embodiment, there are eight gate-flow apertures, each most preferably being circular in shape, having a diameter of seventy-eight one-thousands of an inch, and being disposed circumferentially about the valve plate.

With reference to the winterization procedure discussed above, antifreeze may be introduced to the pool pipes at or near the pool pump by a compressor connected (temporarily or fixed) to the system. The compressor is turned on until a predetermined amount of antifreeze is input into the pipe(s) or until antifreeze just begins to exit the valve assembly.

Figure 5:
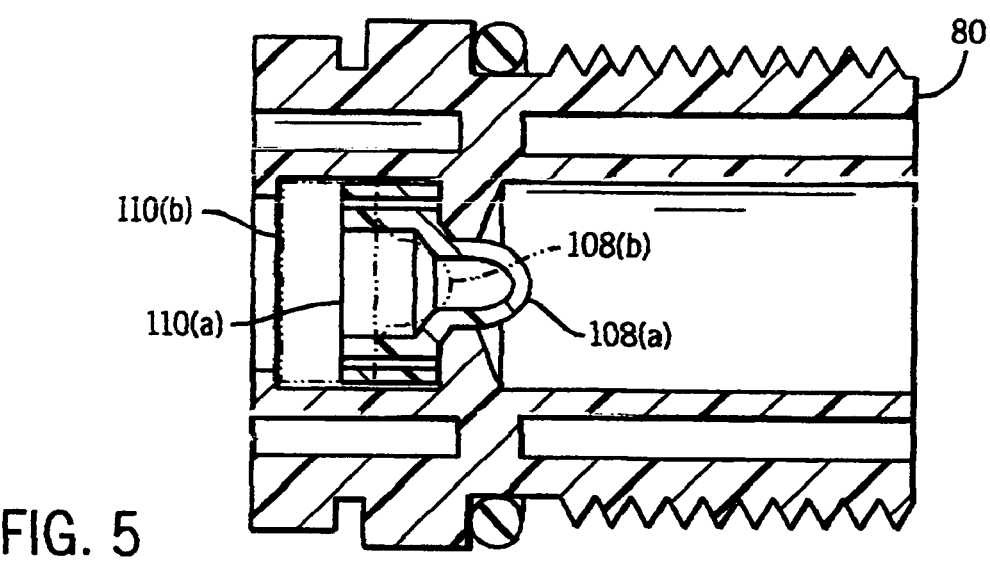
FIG. 5 is a cross-sectional view taken along lines 5-5 of FIG. 3 showing the valve gate in the valve closed position and showing in phantom the valve gate in the open position.

When the pool pump is turned-off and air or antifreeze is in the pool pipe, the water in the pool exerts force against the inner surface 94 of the conical plug and also against the surface 110 of the valve gate 90 adjacent the valve outlet, moving the valve gate to a closed position (shown in FIG. 5). In this embodiment, flow aperture 84 is shaped to receive conical structure 108(a) and guide the valve gate as it moves between the open and the closed positions. In the closed position the opposing surface 112 of the valve gate is juxtaposed to the gate plate 106, closing off the gate-flow apertures 92, preventing pool water from flowing back into the flow cavity 82.

The valve housing is configured so that it may be secured at a pool aperture to a pipe end. Typically, the pipe end is internally threaded. Thus, the valve housing is preferably provided with a threaded outer surface 96 having a diameter of one and seven-hundred and fifty one-thousands inches, and a rim 98 for securing the valve assembly to a pool orifice. A one-eight inch diameter O-ring 100 is preferably utilized to ensure an air-tight seal between the valve assembly and the pipe end, as well as between the outer diameter of the valve assembly and inner diameter of the pool wall or pipe mounting plate. It is preferable to coat threaded surface 96 with several layers of a suitable tape, such as that sold under the trademark TEFLON®, to create a seal between the valve housing and the pipe end, and also to prevent the housing threads from burning (due to friction heat) to the pipe threads as the housing is screwed on.

Alternatively, if the pool pipe end is not internally threaded but rather has another mating mechanism, the pool valve housing may be configured/molded with a reciprocating mechanism, or alternatively, a reciprocating mechanism may be threaded to the valve housing discussed above.

To facilitate molding of the valve housing, in one embodiment components of the valve housing are tapered in accordance with the following: the diameter of the threaded surface of the housing is tapered down six one-hundredths of an inch from the O-ring to the end of the housing; the diameter of the flow cavity is increased one hundred and twenty five one-thousandths of an inch from the flow aperture 84 to the end of the housing; the diameter of the gate channel 88 is increased one one-hundredth of an inch from the flow aperture to the containment lip; the outer diameter of the housing is tapered three one-hundredths of an inch from groove 102 to the end of the valve (the end associated with the containment lip); housing surfaces defining other open spaces (such as shown at 104) in the valve housing may also be slightly tapered to facilitate the molding process.

Referring again to FIG. 3, optional but preferred winterization components for use with the valve assembly component are shown and include a rubber cap 116. The rubber is provided for placement over the valve assembly after all the water is pumped out of a pipe and the valve closes. The rubber cap 116 functions to further ensure that water/moisture cannot enter the valve assembly. In the present embodiment, the valve housing has a groove 102 (see FIG. 4) configured for receiving a radially inward extending lip 118 of the rubber cap for securing the cap to the valve housing. Preferably, the rubber cap also has a raised surface 120 dimensioned to cover the outer surface 110 (see FIG. 4) and/or flow apertures 92 of the valve gate 90 when the valve housing receives the cap. The raised surface further serves to hold the valve gate against the gate plate. With the valve assembly in a closed state and the pipe having been emptied of all water the cap is preferably placed on the valve for the duration of the winter. To facilitate placement of the cap 116 over the valve assembly, marine grease may be rubbed along the lip 118 and over the raised surface 120.

Figure 7:
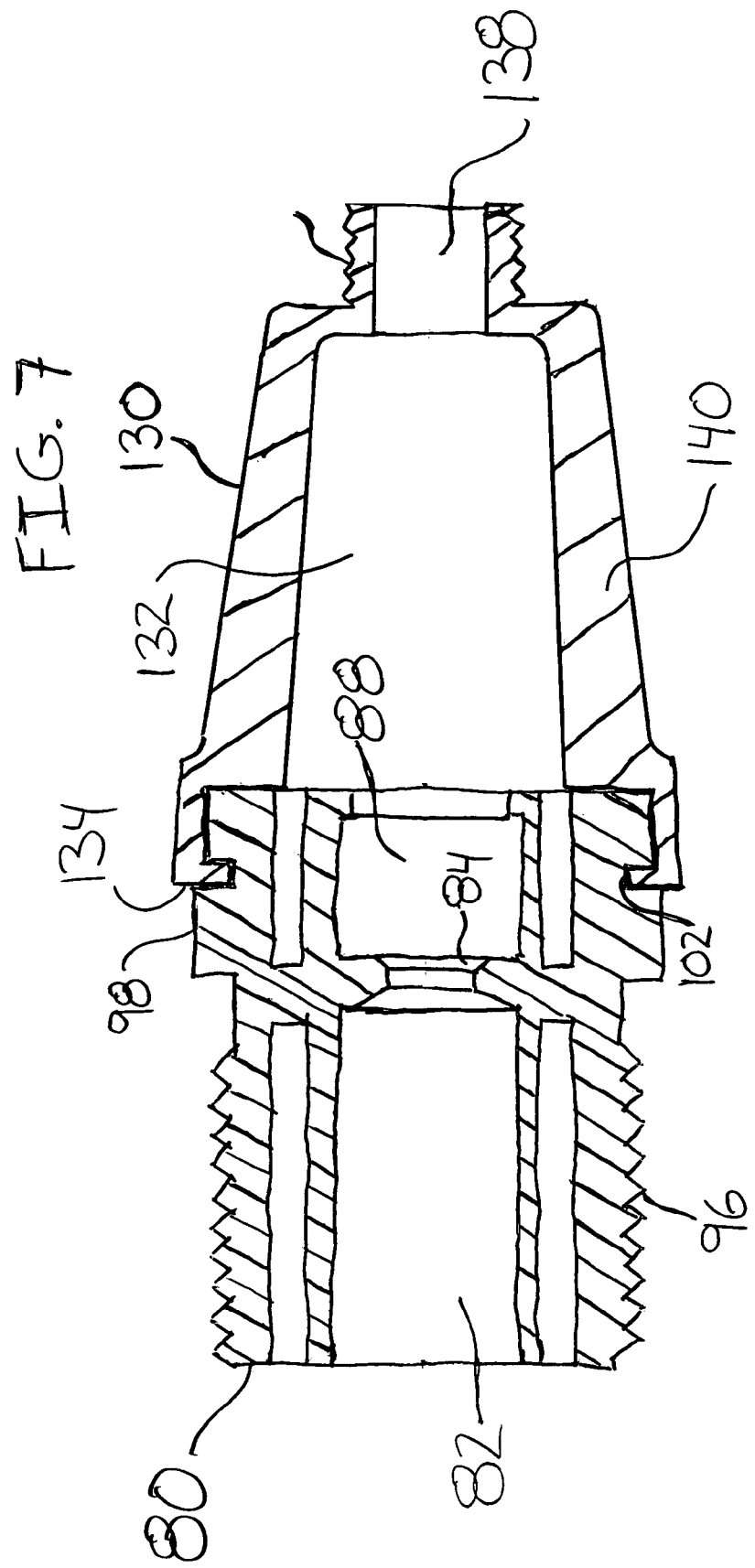
FIG. 7 is an exploded cross sectional view of an adaptor coupled to the valve assembly (the valve gate not being shown for clarity) of the preferred embodiment.

The adaptor component 130 of the present invention is shown in FIGS. 7 and 8. In the preferred embodiment, the adaptor component comprises a substantially cylindrical rubber housing 140. Both ends of the housing have an aperture, as shown. An adaptor flow channel 132 traverses longitudinally through the rubber housing, comprising a tubular passage. In the present embodiment, the adaptor component is configured for attachment to the valve assembly 80 at groove 102. For this purpose, the adaptor has a circumferential, inward extending lip 134, dimensioned to fit snugly around groove 102 and forming a water-tight seal between the valve housing and the adaptor inlet 142. In application, water or liquid pumped from the pool pipes flows through the valve assembly, through the adaptor flow channel 132 to the adaptor outlet 138.

The outlet 138 may be configured to serve one or several purposes. In the preferred embodiment, the outlet includes a threaded plastic external surface 136 for attachment to a hose. In a further embodiment, the outlet comprises a filtration device, such as mesh, for removing suspended matter.

In application, the valve system provides a flow conduit so that liquid, typically antifreeze, can pass from the pool pipes to the inlet of a hose. Thus, at the end of the winter season, the rubber cap is first removed from the valve assembly. The adaptor is then coupled to the valve, and a hose is threaded to the opposite end of the adaptor. The outlet of the hose is preferably fed into a receptacle. The fluid (primarily antifreeze solution) in the pool pipes is thereby pumped out of the pool pipes into the receptacle and salvaged.

In alternate embodiments, the adaptor assembly may be constructed of a material other than rubber, such as plastic or metal and/or the housing may take a form other than cylindrical, such as square or triangular, provided that the adaptor inlet is configured for attachment to the valve assembly. In other alternative embodiments, the valve assembly and adaptor are permanently attached and/or manufactured as one contiguous body.

Referring once again to FIG. 3, a valve assembly socket 122 is shown as an optional component. The valve assembly socket 122 is used to loosen the valve assembly from the pipe. The socket has a pair of arcuate dogs 124 configured to fit into an open space 104 of the valve housing 80 (shown in FIG. 6) having a catch 114 on both sides thereof. A preferably square-shaped aperture 126 (also shown in phantom in FIG. 6) receives a wrench, enabling one to generate sufficient torque to remove the valve assembly.

Preferably, the valve assembly of the second embodiment and the socket are molded from forty percent calcium-filled polypropylene.

It is to be understood that the above-described embodiments are merely illustrative of the principles of the invention and that many variations may be devised by those skilled in the art without departing from the scope of the invention. It is, therefore, intended that such and other variations be included within the scope of the claims.

I claim:

1. A method for winterizing a swimming pool pipe having anti-freeze therein and having a first end bordering an aperture in a swimming pool wall, said method comprising the steps of:
   a) connecting and providing a one-way valve to the first end of the swimming pool pipe, wherein the one-way valve for use in discharging fluid from a swimming pool pipe to said first end bordering an aperture in swimming pool wall comprises;
   a valve housing having an inlet and an outlet and securable to the pool pipe for receiving at said inlet fluid discharged from said pool pipe; and
   a valve gate within said valve housing comprising a plug and a control plate fixed perpendicularly to the central axis of the plug, the periphery of the control plate extending radially beyond the plug and having at least one flow aperture,
   wherein said valve gate is moveable within said valve housing to a first position having said at least one flow aperture spaced from said valve housing for permitting fluid to flow through said valve housing and to a second position having said at least one flow aperture adjacent said valve housing for occluding the flow of fluid through said valve housing;
   b) attaching a first end of a hose adaptor to the one-way valve outlet, wherein said hose adaptor comprising; a substantially cylindrical rubber housing and both ends of said housing having an aperture, a flow channel traverses longitudinally through said housing forming a tubular passage, a adaptor inlet, wherein said adaptor inlet having a circumferential, inward extending lip, wherein said lip is configured for attachment to said one-way valve at a groove of said one-way valve;
   c) attaching a second end of said hose adaptor to a hose, wherein said second end of said hose adaptor comprising a threaded plastic external surface for attachment to said hose;
   d) pressuring the anti-freeze within the swimming pool pipe; and wherein said one-way valve i) opens under the pressure of anti-freeze pumped against said valve inlet, and ii) closes under the pressure of pool water against the valve outlet.

2. The method of claim 1 further comprising the step of storing the anti-freeze.

3. The method of claim 1 further comprising the step of pressurizing water at a second end of the swimming pool pipe, wherein the anti-freeze within the swimming pool pipe is responsively pressurized.

4. The method of claim 3 further comprising the steps of:
   (a) depressurizing the water at the second end of the swimming pool pipe, wherein the pressure of water against the valve outlet closes the valve; and
   (b) removing the hose adaptor from the one-way valve.

5. The method of claim 4 further comprising the step of: capping a one-way valve.

6. The method of claim 1 further comprising the step of filling the swimming pool with water to a level above the aperture in the swimming pool wall.

7. The method of claim 1 further comprising the steps of:
   (a) filling the swimming pool with water to a level above the aperture in the swimming pool wall;
   (b) pressurizing water at a second end of the swimming pool pipe;
   (c) storing the anti-freeze; and
   (d) removing the hose adaptor from the one-way valve.

8. The method of claim 7 further comprising the step of: adding anti-freeze to a second end of a swimming pool pipe.

* * * * *